(12) United States Patent
Dietz

(10) Patent No.: US 7,237,506 B2
(45) Date of Patent: Jul. 3, 2007

(54) MULTIPLE FUNCTION ANIMAL BED

(76) Inventor: Dan L. Dietz, 10234 Emerald Dr., Houston, TX (US) 77074

(*) Notice: Subject to any disclaimer, the term of this patent is extended or adjusted under 35 U.S.C. 154(b) by 0 days.

(21) Appl. No.: 11/121,797

(22) Filed: May 4, 2005

(65) Prior Publication Data
US 2006/0249085 A1    Nov. 9, 2006

(51) Int. Cl.
*A01K 1/035* (2006.01)
(52) U.S. Cl. .................... 119/28.5; 108/41
(58) Field of Classification Search .......... 119/28.5, 119/482, 485, 706; 297/188.08; 15/258, 15/259, 265; 108/27, 38, 41; 5/6, 9.1
See application file for complete search history.

(56) References Cited

U.S. PATENT DOCUMENTS

| | | | |
|---|---|---|---|
| 2,532,863 A * | 12/1950 | Taylor | 217/14 |
| 2,579,797 A | 12/1951 | Churchfield et al. | |
| 3,234,908 A | 2/1966 | Doskocil | |
| 3,618,568 A | 11/1971 | Breeden | |
| 4,224,899 A | 9/1980 | Cruchelow et al. | |
| 4,253,204 A * | 3/1981 | Tasaka | 5/2.1 |
| 4,334,501 A | 6/1982 | McDaniel et al. | |
| 4,347,807 A * | 9/1982 | Reich | 119/499 |
| D288,970 S | 3/1987 | Runion | |
| 4,719,656 A | 1/1988 | Godinet | |
| 4,838,204 A | 6/1989 | Young | |
| 5,148,768 A | 9/1992 | Hinton | |
| 5,211,130 A * | 5/1993 | Elias et al. | 119/28.5 |
| D369,885 S | 5/1996 | Zeiler | |
| 5,662,065 A | 9/1997 | Bandimere et al. | |
| 5,765,505 A | 6/1998 | Yun | |
| 5,778,822 A | 7/1998 | Giffin et al. | |
| 6,189,487 B1 | 2/2001 | Owen et al. | |
| 6,267,082 B1 | 7/2001 | Naragon et al. | |
| 6,295,950 B1 | 10/2001 | Deitrich et al. | |
| 6,490,995 B2 | 12/2002 | Greene, Jr. | |
| 6,588,366 B1 * | 7/2003 | Ranson et al. | 119/28.5 |
| 6,748,895 B2 | 6/2004 | Besenzoni | |
| 2002/0152969 A1 | 10/2002 | Grigsby et al. | |
| 2003/0066489 A1 | 4/2003 | Whitehill | |
| 2004/0134433 A1 | 7/2004 | Holder | |
| 2004/0177814 A1 | 9/2004 | Godshaw | |
| 2005/0279286 A1 | 12/2005 | Youngmark | |
| 2006/0042548 A1 * | 3/2006 | Tharalson et al. | 119/28.5 |
| 2006/0112897 A1 | 6/2006 | Moore | |
| 2006/0118051 A1 | 6/2006 | Lima | |

OTHER PUBLICATIONS

PCT International Search Report for International Application No. PCT/US2006/017361 dated Sep. 12, 2006 (2 p.).
PCT International Search Report for International Application No. PCT/US2006/017029 dated Sep. 15, 2006 (2 p.).
PCT International Search Report for International Application No. PCT/US2006/017011 dated Sep. 11, 2006 (2 p.).

* cited by examiner

*Primary Examiner*—Rob Swiatek

(57) ABSTRACT

An animal furniture bed having one side open to allow for storing of objects in an area of the bed below the sleeping surface. The bottom of that open side has a lip element that extends the complete length of that side to prevent objects from rolling out of the furniture bed. Lips can also extend upward from each side to create an area in which to place a sleeping pad for an animal. The pad serves as the animal bed.

3 Claims, 2 Drawing Sheets

MULTIPLE FUNCTION ANIMAL BED

FIELD OF THE INVENTION

This invention relates to an animal bed and in particular to a multiple function animal bed, which also serves as a storage location for objects, related to the animal, as a bench for humans and as an animal step for getting into a human bed.

BACKGROUND OF THE INVENTION

There have been many types of animal beds. These beds come in various designs. Some of the designs include beds shaped as different types of animals. Many beds in form of animal designs are made of a cushion material to facilitate animal comfort.

One animal bed U.S. Pat. No. 5,662,065 describes an animal bed that includes an annular bed frame defining an interior chamber. A perforated top wall is supported at its periphery by the bed frame to receive and support the animal above the chamber. The perforated top wall is composed of a non-woven fabric material to provide a hammock like suspension for the animal, and to permit small insects to fall through the top wall. The chamber is dimensioned to provide a space below the top wall sufficient to inhibit the insects from traveling upwardly through the top wall. An insect exterminating composition contained within the chamber receives the falling insects and destroys them.

U.S. Pat. No. d288,970 describes a combined animal bed and housing unit. This design has a bed mat resting on a storage unit. The bed also has a canopy covering the mat. The animal would rest on the mat and would be covered by the canopy.

SUMMARY OF THE INVENTION

It is an objective of the present invention to provide a multiple purpose animal bed.

It is a second objective of the present invention to provide an animal bed with a storage area below the location where the animal rests.

It is a third objective of the present invention to provide a multiple purpose animal bed that can be used as a rest bench for humans.

It is a fourth objective of the present invention to provide a multiple purpose animal bed that can be used as a step for animals to jump to a higher human bed.

The present invention comprises a furniture bed having a shape that can be for example a square or rectangular shape design with four sides, a top surface and an optional bottom surface. One of the sides is open to allow for storing objects in the present invention. Doors can be included on the furniture bed as an option. The bottom of that open side has a lip element that extends the complete length of that side to prevent objects from rolling out of the furniture bed. Lips can also extend upward from each side to create an area in which to place a sleeping pad for an animal. The pad serves as the animal bed. The material for the animal bed element can be of any conventional material that is used in animal beds. The remaining walls of the furniture bed will be solid. The multiple function animal bed would be positioned adjacent a human bed enabling humans to use the bed as a rest bench or as a step to enable animals to get into the human bed.

DESCRIPTION OF THE INVENTION

Figure 1:
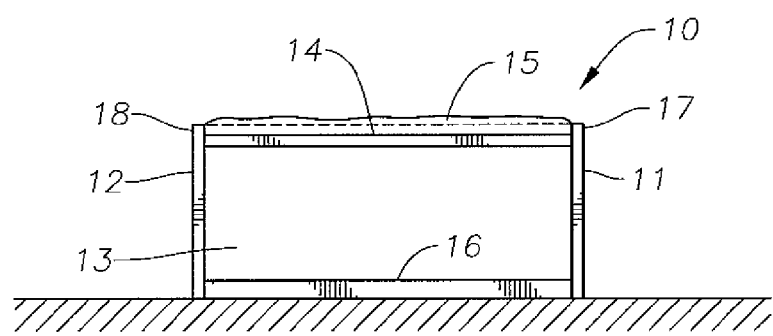
FIG. 1 is a front view of the multiple function animal furniture bed.
Figure 2:
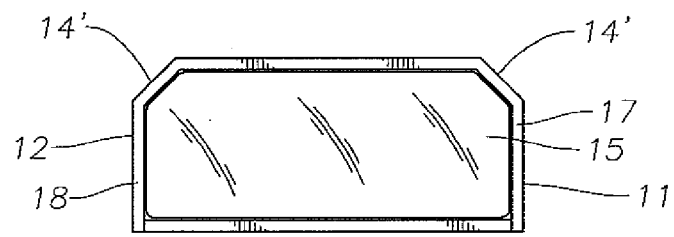
FIG. 2 is a top view of the multiple function animal furniture bed.

Referring to FIG. 1, shown is the front view of the multiple function animal furniture bed 10 of the present invention. The bed 10 can have a generally rectangular shape. Sides 11 and 12 form the two ends of the bed 10. Side 13 is the front and open side of the bed 10. The back side, not shown, is a solid side similar to sides 11 and 12. The back side also has the same dimensions as the front side 13. The bed 10 has a top side 14 as shown in FIG. 2. The top side 14 supports the mat material 15 on which the animal will lay. As shown, the top side 14 can have tapered corners 14'. The bed 10 can have an optional bottom side or floor.

A lip element 16 is positioned at the bottom of the open front side 13. This lip 16 extends the length of the front side 13. The lip 16 serves to prevent objects from rolling out of the storage area of the bed 10. Many objects and toys for animals have rounded shapes and have a tendency to roll. This lip 16 serves as a stop to prevent the objects from rolling out of the storage area. In addition, the sides 11 and 12 have lips 17 and 18 that extend from these sides passed the top side of the bed 10. Similar extensions can also extend from the front and back sides in the same manner as the extensions 17 and 18. These extensions create an area in which to place the mat material 15. Some mats have the tendency to slide in response to the weight of an animal. These extensions will serve to help hold the mat material 15 in place.

Figure 3:
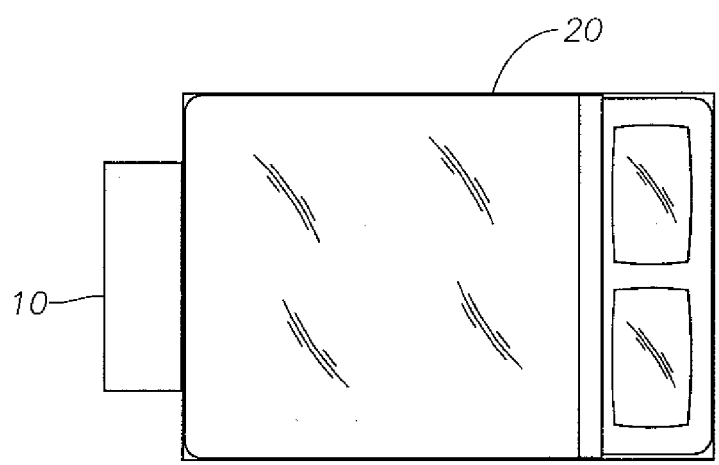
FIG. 3 is a top view of the multiple function animal furniture bed adjacent a human bed.

FIG. 3 shows the multiple function animal furniture bed 10 of the present invention positioned adjacent a human bed 20. Positioning the multiple function animal furniture bed 10 at the foot of the human bed 20 can provide a step for an animal pet to get into a human bed 10. Many people do have pets that sleep in the bedroom. Current art does not provide an animal step for animals to get into a human bed. In addition, this multiple function animal furniture bed 10 has the strength to serve as a bench for humans to use as well.

Figure 4:
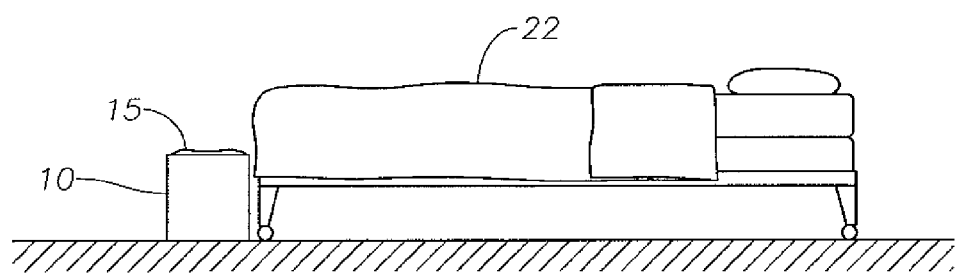
FIG. 4 is a end view of the multiple function animal furniture bed adjacent a human bed.

FIG. 4 gives an end view of the multiple function animal furniture bed 10 of the present invention. Shown is a human bed 20 with a mattress 22. By an animal climbing onto the top side 14 and mat material 15 of the multiple function animal furniture bed 10, the animal will have enough elevation to jump into the high human bed 20.

The multiple function animal furniture bed 10 of the present invention can have various dimensions. In addition, the lip extensions can also have dimensions. For example, the lip extension at the bottom does not need to have the same dimensions as the lip extensions at the top. In a preferred embodiment, all lip extensions can be two to three inches in height.

Figure 5:
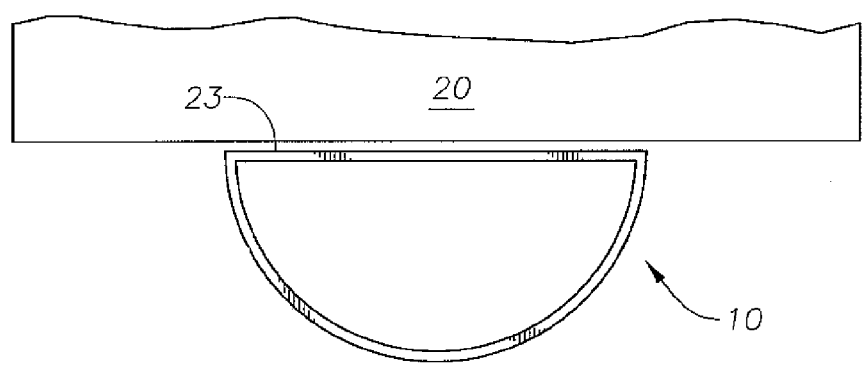
FIG. 5 is a top view of an alternate embodiment of the present invention.

FIG. 5 is an alternate embodiment of the present invention in which only the side 23 adjacent the human bed 20 would have a substantially straight design. The other previously described features would be the same as in the other embodiments.

In addition to the lip extensions 17 and 18 on the topside, other attaching means can be used to secure the mat material 15 to the top side 14 of the bed 10. These means can include straps attached to the bed 10 that will restrain the mat material 15. Another means is an attaching or adhesive material such as the material known under the Trademark Velcro. This material can be attached to a skirt that would be attached to the mat material 15.

The present invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

I claim:

1. An animal furniture bed capable of being used to perform multiple functions comprising:

a top side to support an animal;

an open side attached to and below said top side and extending to the floor to create a storage area below said top side, to allow for storing of objects in that storage area;

a lip element extending up from said open side and extending the length of said open side, wherein the lip element is secured to the open side;

at least one lip element extending upward from said top side to provide a restraint means for a sleeping surface, wherein the at least one lip element extends around a perimeter of the top side: and wherein said open side comprises a front wall attached to said top side and extending downward, said front wall having a convex shape such that the wall and top side create the enclosed storage area.

2. The animal furniture bed as described in claim 1 further comprising the sleeping surface for an animal positioned on said top side.

3. The animal furniture bed as described in claim 2 wherein the sleeping surface is a cushioned material.

* * * * *